United States Patent Office 3,523,813
Patented Aug. 11, 1970

3,523,813
APPLICATION OF A PRINTED IMPRESSION
OF METAL POWDER ONTO ARTICLES
Willy Koller, Falkenweg 14, Baar,
Zug, Switzerland
No Drawing. Filed Aug. 17, 1966, Ser. No. 577,566
Claims priority, application Switzerland, Sept. 2, 1965,
12,303/65
Int. Cl. B41m 1/22; B44d 1/92, 1/94
U.S. Cl. 117—13                                    2 Claims

ABSTRACT OF THE DISCLOSURE

In applying a printed impression of metal powder onto an article, a mixture of a hardenable synthetic resin, a hardener therefor, and a heat sealable adhesive are applied to the article in selected areas to form a reproduction of the printed impression. Metal powder is thereafter transferred to such selected areas and thereafter bonded by heat and pressure.

---

This invention relates to an improved method for the application of a printed impression of metal powder onto articles by transfer of the powder from a carrier and in apparatus therefor.

The application of printed impressions of metal powder by means of embossed sheets by relief printing on to articles such as boxes and bottles of synthetic material sheet metal or glass is impossible if the material is not deformable and flexible in order to allow imprinting. Printing on such articles by means of embossed sheets using a heated block or type block does not given a clear impression when the articles to be printed have an uneven surface which is normally the case with synthetic material or glass. Further the heat sealable adhesive with which the layer of metal powder is provided on the carrier of such embossed sheets does not adhere permanently to the articles.

These disadvantages are obviated by the method according to the invention in that for the binding of the metal powder to the article a mixture consisting of a hardenable synthetic resin, a hardener therefore and a heat sealable adhesive is used and the transfer of the metal powder from the carrier onto the article is effected by using pressure and heat through a flexible pressing medium.

The apparatus for the carrying out of the method comprises a holding and feed device for the articles to receive the printed impression, a heated press tool with a flexible pressing face and a conveying and switching means for the carrier.

For the carrying out of the method the article may be imprinted by screen printing with a mixture of a synthetic resin containing a hardener therefor and a heat sealable adhesive so that a reproduction corresponding to the printed impression (scrift with or without illustration) is produced in the mixture thereon. A carrier such as a paper band or sheet covered with metal powder is brought under heat and pressure into contact with the article in order to transfer the metal powder from the carrier band on to the article. In order that the carrier with the coating thereon may lie uniformly on the article a pressing tool covered with a heat resisting flexible material is employed.

The metal powder coating becomes detached from the carrier band and adheres to the printed areas of the article.

Alternatively a negative reproduction of the printed impression for transfer to the article may be produced in the mixture of metal powder, synthetic resin and hardener on the carrier band and transferred to the article. Pressure is applied to transfer the coating of synthetic resin, hardener and metal powder to the article.

As a heat sealable adhesive is used the apparatus for carrying out the method requires a heated press tool in the form of a heat resistant flexible layer for satisfactorily pressing the carrier band on to the article. The impression is therefore perfectly sharp even when the surface of the article to be printed is uneven.

The pressing tool preferably contains an electric heating element and is movable up and down in relation to the article, the tool being covered with a heat resistant flexible sheath.

The synthetic resin used is preferably an epoxy resin.

The articles may be held on a conveyor band or a conveyor drum by means of clamps during the application of the printed impression.

With round and cylindrical or conical articles the transfer of the metal powder coating etc. is effected by rolling on the press tool. The carrier band may be advanced step by step with the step by step movement of the conveyor band or the conveyor drum in order to bring new portions of the carrier band to the point of application.

The method described is suitable in particular for the production of printed impressions with gold paint on articles whereby a permanent high gloss reproduction is attained which adheres well to the articles.

What I claim is:

1. A method for the application of a printed impression of metal powder on to an article comprising applying a mixture of a hardenable synthetic resin, a hardener therefor and a heat sealable adhesive to an article, said mixture being applied in selected areas to form a reproduction of the printed impression, applying a metal powder to a flexible carrier band, transferring the metal powder from the carrier band to said selected areas of the aforesaid mixture on the article, and bonding said transferred metal powder to said selected areas by heat and pressure applied through a flexible pressure medium against said carrier band, wereby the metal powder forms said printed impression.

2. A method for the application of a printed impression of metal powder on to articles as claimed in claim 1 comprising the incorporation of an epoxy resin into the mixture.

References Cited

UNITED STATES PATENTS

| 1,331,581 | 2/1920  | Rosenfeld       | 117—3.3    |
| 1,815,010 | 7/1931  | Pollock et al.  | 117—235 X  |
| 1,882,593 | 10/1932 | Hentschel       | 117—3.3    |
| 2,297,691 | 10/1942 | Carlson         | 117—25     |
| 2,302,179 | 11/1942 | Bronfman        | 117—13     |
| 2,567,186 | 9/1951  | Cross et al.    | 117—16     |
| 2,703,772 | 3/1955  | Keithly         | 117—3.3    |
| 2,855,324 | 10/1958 | Van Dorn        | 117—25     |
| 2,990,278 | 6/1961  | Carlson         | 117—17.5 X |
| 3,235,395 | 2/1966  | Scharf          | 117—3.3    |

FOREIGN PATENTS 721,906    1/1955   Great Britain.

WILLIAM D. MARTIN, Primary Examiner

R. M. SPEER, Assistant Examiner

U.S. Cl. X.R.
117—15, 25, 31